Inventor:
PETER GOSGER

Inventor:
PETER GOSGER

United States Patent Office 3,769,192
Patented Oct. 30, 1973

3,769,192
METHOD OF ELECTROCHEMICALLY DEBURRING METAL WORKPIECES AND APPARATUS FOR PERFORMING THE SAME
Peter Gosger, Burg an der Wupper, Germany, assignor to AEG-Elotherm GmbH, Remscheid-Hasten, Germany
Filed Aug. 11, 1971, Ser. No. 170,777
Claims priority, application Germany, Aug. 11, 1970, P 20 39 789.1
Int. Cl. B23p 1/04
U.S. Cl. 204—201
14 Claims

ABSTRACT OF THE DISCLOSURE

A method and apparatus for deburring the edges of workpieces whereby a deburring electrode is disposed adjacent a workpiece on a workpiece carrier so as to define a gap. The electrode includes an electrolyte chamber closed on the side adjacent the workpiece by plate having apertures distributed over its surface so that the electrolyte flows out the apertures and over the edges to be deburred.

BRIEF DESCRIPTION OF THE PRIOR ART AND SUMMARY OF THE INVENTION

The invention relates to a method of and apparatus for electrochemically deburring metal workpieces, which relate to presenting a deburring electrode, to which a potential is applied that is negative with respect to the workpieces, to the workpiece in a manner defining a gap between the electrode and the workpiece through which a stream of electrolyte is conducted so as to flow over the edges that are to be deburred.

In a conventional machine of this kind, the deburring electrode is shaped to follow the goemetrical configuration of the edges that are to be deburred and disposed with respect to the workpiece so that there is produced along the workpiece edges an electrical field concentration in the electrolyte and hence an increased current density which provides a higher rate of electrochemical abrasion and hence removes the burrs.

Conventional apparatus of this kind for electrochemically deburring workpieces usually include an electrolyte which also contains a workpiece carrier and often is also adapted to prove contact for an electric connection between the workpiece and the positive pole of a voltage source. After the workpiece has been placed on the carrier, the deburring electrode, which is slidable in the machine frame, is lowered into working position above the workpiece, and the electrolyte is supplied through channels in the tool electrode and the electrical deburring current is switched on.

In conventional equipment, locating the workpieces in exactly the same and reproducible positions in relation to the deburring electrode is often a matter of considerable difficulty when deburring certain types of work, such as plate-shaped workpieces, stampings, gears and so forth. Moreover, in these machines a special deburring electrode and workpiece carrier adapted to each particular type of workpiece is needed.

It is the object of the present invention to provide a method, and apparatus for performing the same, whereby electrochemical deburring processes, particularly in the case of flat plate-shaped workpieces having differently disposed edges can be performed with the aid of the same deburring electrode, and wherein the location of the work in relation to the deburring electrode is not critical.

According to the method proposed by the present invention this is achieved by using a deburring electrode which has an electrochemically active surface that covers the workpiece edges and extends substantially independently of the configuration of the edges. The electrolyte is introduced into the gap between the deburring electrode and the workpiece through orifices and/or pores distributed over the active electrode surface and drained out of the gap so that it flows over the workpiece edges that are to be deburred. In a preferred embodiment of this method, particularly for deburring flat plate-shaped workpieces, the workpiece is moved during the deburring process relative to the deburring electrode in a direction or directions parallel to the electrochemically active electrode surface.

According to this invention, apparatus for performing the method includes a deburring electrode containing an electrolyte chamber which, on its side facing the workpiece, is closed by a metal screen, particularly a perforated plate, or porous sinter metal plate, so that the outer surface of the screen or plate forms the active surface of the deburring electrode. The dimensions and the number of the orifices in the metal screen or of the pores in the sinter metal plate are chosen so that the pressure drop of the electrolyte upon passing through the metal screen or the porous sinter metal plate is large compared with the pressure drop experienced by the electrolyte in the gap between the deburring electrode and the workpiece.

In a particularly useful embodiment, the proposed apparatus has a workpiece carrier with a workpiece supporting surface that is at least approximately parallel to the electrochemically active surface of the deburring electrode, and elements connected to the positive pole of a source of working voltage for establishing contact with the workpiece. Preferably the workpiece carrier contains elements for locating a workpiece on the workpiece supporting surface and drive means are provided for moving the workpiece carrier in a direction or directions parallel to the electrochemically active surface of the deburring electrode.

In another particularly useful embodiment of the proposed apparatus the workpiece supporting surface is constituted by the surface of a graphite plate which simultaneously functions as the element for establishing electrical contact with the workpieces.

In another advantageous embodiment of the proposed apparatus, the workpiece supporting surface is constituted by surfaces of supporting strips made of ceramic material on the workpiece carrier. Preferably in this case, the elements for establishing electrical contact with the workpieces are a plurality of graphite plates resiliently mounted yieldingly in the workpiece carrier.

In a modification of the proposed apparatus for deburring or rounding the edges of workpieces of ferromagnetic materials, the elements for locating the workpieces on the workpiece supporting surface of the workpiece carrier may be permanent magnets. In the embodiment in which the workpiece supporting surface is a graphite plate, which also functions for making electrical contact with the workpieces, the permanent magnets may conveniently be situated in the workpiece carrier underneath the graphite plate. In the embodiment comprising resiliently yielding graphite plates in the workpiece carrier, the permanent magnets may be situated between these plates.

In a preferred embodiment of the proposed apparatus the workpiece carrier is a turntable above which is a deburring electrode is mounted covering a segment of the turntable, so that part of the turntable surface which is not covered by the electrode is associated with a workpiece loading station and a workpiece unloading station. The workpiece loading station preferably consists of a loading chute which terminates on the turntable, where the workpiece unloading station comprises an ejecting rail above the turntable for sweeping the workpieces into an unloading chute.

Finally a preferred embodiment of the proposed apparatus for deburring and rounding the edges on both sides of at least substantially flat plate-shaped workpieces is characterized by two vertically superimposed coaxial turntables, each associated with a deburring electrode and by a turnover chute for accepting the workpieces from the unloading station of the upper turntable and delivering the same to the loading station of the lower turntable after turning them upside down.

Figure 1:
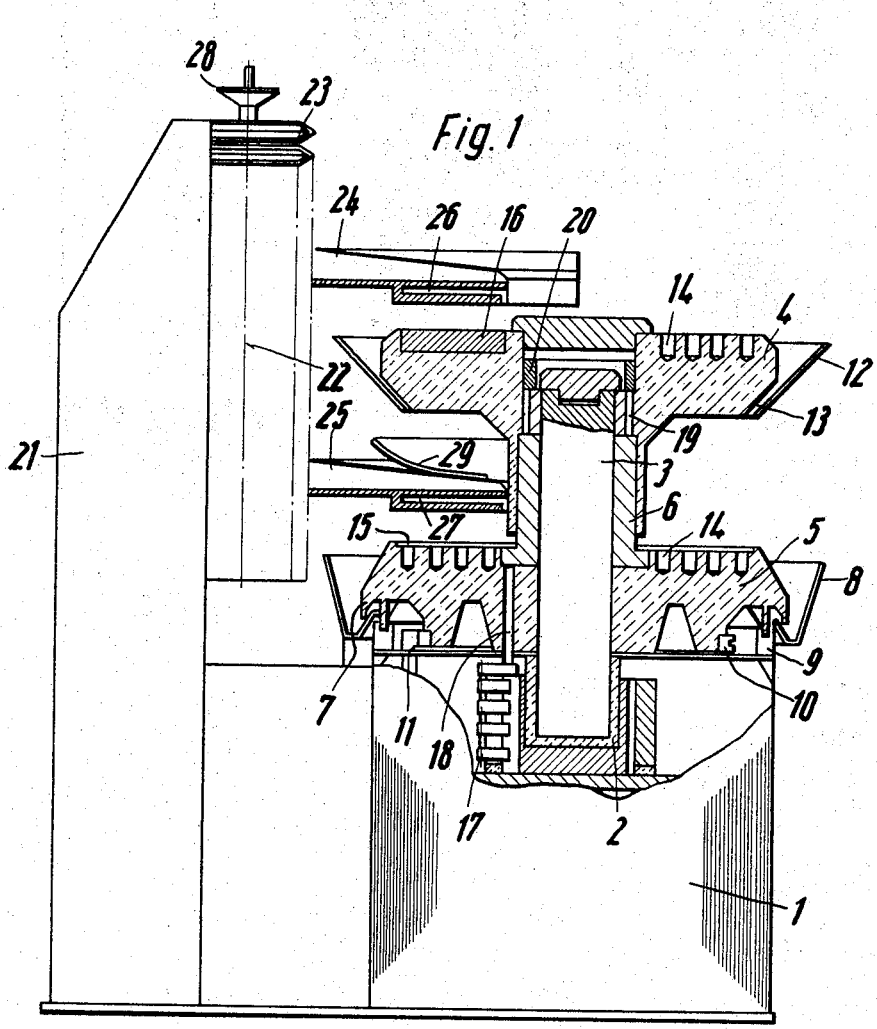
FIG. 1 illustrates a machine for deburring both sides of flat plate-shaped workpieces, the machine being shown schematically in part sectional elevation.

Referring to FIG. 1, the machine frame comprises a pedestal 1 which carries a column 3 in an electrically insulating bush 2. A turntable assembly is supported by column 3 and includes two vertically superimposed turntables 4 and 5, interconnected by an electrically conducting sleeve, whereas the tables themselves are constructed of an insulating material. The body of the lower turntable 5 has an annular extension 7 at its bottom edge, which projects into independent annual electrolyte trough 8 mounted on the casing of the pedestal 1. The body of lower turntable 5 is also connected to the casing of the pedestal 1 by a ring-shaped oil seal 9. The body of the lower table is incidentally provided, inside this oil seal 9, with a gear ring 10 which meshes with a pinion 11 of a drive means (not shown in FIG. 1) which is preferably accommodated inside the pedestal 1 for driving the turntable assembly. For the discharge of the electrolyte from upper turntable 4 the latter has a cone-shaped electrolyte collecting trough 12, which is attached to the turntable, embraces the same and forms channels 13 between itself and the table for draining away the electrolyte. The upper flat faces of the turntables 4 and 5 contain locating elements 14 and elements 15 and 16 for making electrical contact. These will be later described in greater detail below with reference to FIGS. 2 to 4.

The electrical connection of the positive pole of the voltage source to the electrical contact elements 15 and 16 in the surfaces of the turntables is provided by a slip-ring contact device 17, conducting pins 18 and the sleeve 6 for the lower table 5 and by the sleeve 6, conductor pins 19 and a distributor ring 20 for the upper turntable 4.

From the pedestal 1 upwards the machine frame has the form of an elevated box-section column 21 up and down which two cantilever slides 24 and 25 can be immediately and adjustably raised and lowered in ways which are merely indicated by a line 22 since they are hidden by a metal bellows 23. Slides 24 and 25 carry box-shaped deburring electrodes 26 and 27, respectively. The slides 24 and 25 are preferably elevated and lowered by feed screws (not shown in FIG. 1) which are operable by hand wheels 28.

For carrying away the electrolyte draining through the channels 13 of the upper table 4, an electrolyte collecting dish 29 is secured to the slide 25 above the deburring electrode 27. The means for loading and unloading the workpieces on and from the turntables are omitted in FIG. 1 for the sake of greater clarity, and is described with reference to FIG. 2.

Figure 2:
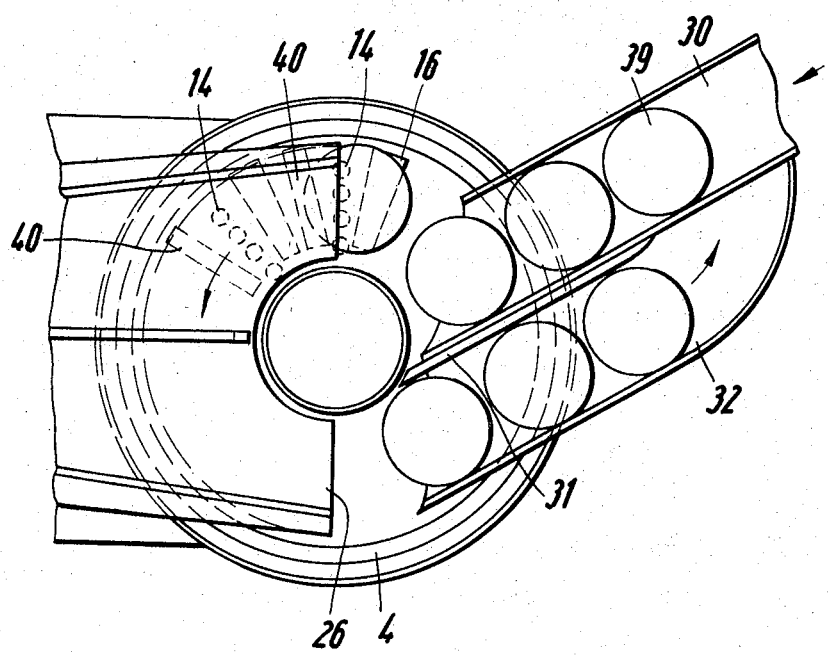
FIG. 2 shows a top view of part of the machine of FIG. 1.

With reference to the box-shaped deburring electrodes 26 and 27, FIG. 2 shows the outline of the electrode 26 associated with the upper turntable 4, covering a surface in the form of a semi-annulus. For feeding the workpieces, which in FIG. 2 are assumed to be round blanks, to the upper turntable 4, a loading chute 30 is provided. The workpieces are discharged by an ejector rail 31 which sweeps the workpieces into a turnover chute 32 which feeds the workpieces to the lower table 5 after having turned them underside upwards. The discharge of the workpieces from the lower turntable 5 (not shown in the drawings) is likewise effected by an ejector rail which sweeps them into a suitable unloading chute.

Figure 4:
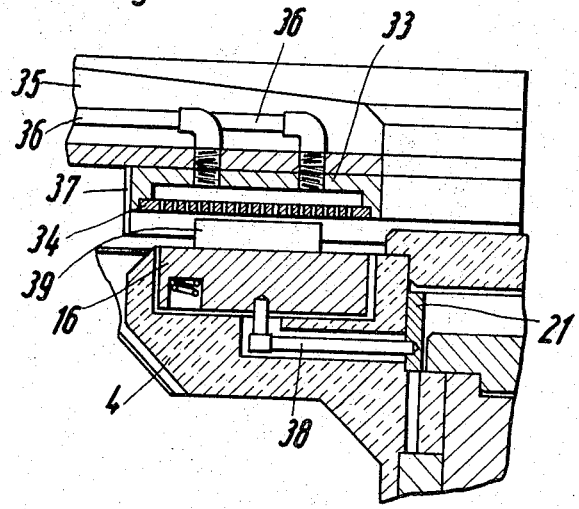
FIG. 4 shows a cut away view of another deburring electrode.
Figure 3:
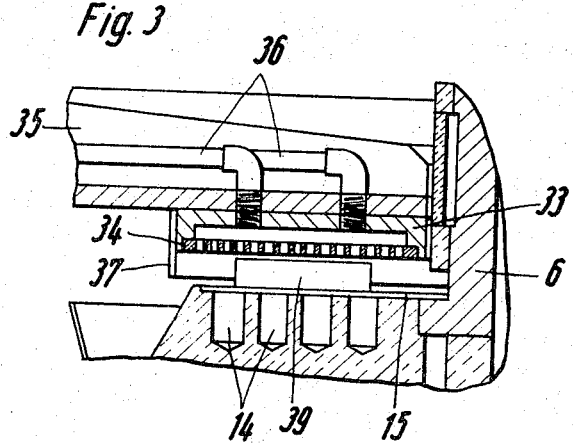
FIG. 3 shows a cut away view of one deburring electrode.

The box-shaped deburring electrodes 26 and 27 and the sections of the associated turntables 4 and 5 which they face are reproduced in section in detail in FIGS. 3 and 4.

These two box-like deburring electrodes 26 and 27 are of substantially identical construction. They each consist of a flat inverted trough-shaped body 33 of circular segmental shape in plan, closed on the underside by a metal screen 34 in the worm of a perforated plate. These deburring electrodes 26 and 27 are attached to cantilever supporting arms 35 of the carrier slides 24 and 25, respectively, through which they are also electrically connected to the negative pole of the voltage source. For the purpose of feeding the electrolyte to the deburring electrodes the cantilever supporting arms 35 contain electrolyte admission pipes 36. At the extremity of each electrode 26 and 27, the latter preferably contains an electrolyte antisplash shield made of plastics.

In the embodiment of FIGS. 1-4, the elements for locating the workpieces on the turntable are permanent magnets 14 let into the flat table top of the lower turntable 5 as can be seen in FIG. 3. The table top itself is covered with a graphite plate 15 which serves for making electrical contact with the workpieces, and which provides an electrically conducting connection between the workpieces and the positive pole of the source of voltage through the sleeve 6.

In the upper turntable 4 as shown in FIG. 4, electrical contact with the workpieces is established by several resiliently mounted segment-shaped graphite plates 16 let into and equidistantly distributed over the table top. They are connected by flexible leads 38 and a distributor ring 21 to the positive pole of the source of voltage. Between the graphite plates 16 ceramic strips 40, as shown in FIG. 2, are let into the top of turntable 4 for supporting the workpieces at defined elevations. A number of permanent magnets 14 are provided for location of the ferromagnetic workpieces by pulling them down on these ceramic strips 40.

The described apparatus functions as follows. The workpieces for instance punched round plate-shaped steel blanks, are fed down loading chute 30 to upper turntable 4 and placed with the burred edge from the punching operation facing upwards. These blanks 39, according to their size, are deposited on one or more ceramic strips 40 let into the table top or on the yieldingly mounted graphite plates 16. Attracted by the permanent magnets, the blanks 39 press down on the ceramic strips 40. The graphite plates 16 are urged with a defined spring thrust against the workpiece 39 to establish good electrical contact for connection to the positive pole of the voltage source.

During the deburring process the box-shaped deburring electrode 26 is fed with electrolyte under pressure and this issues from the fine orifices in metal screen 34 and enters the space between the electrode 39 and the turntable 4 through which the workpieces 39 on the rotating table continuously travel.

The electrolyte, which through the orifices in the metal screen 34 enters the gap between the electrochemically active electrode surface constituted by the outside surface of the metal screen 34 and the workpiece, fans out laterally and flows over the workpiece edges that require deburring. The dimensions and distribution of the orifices in the metal screen 34 are so chosen that the pressure drop in the electrolyte when passing through the metal screen 34 is large compared with the pressure drop of the electrolyte in the gap between the deburring electrode and the workpiece. The result is that the distribution of the streaming electrolyte between the orifices in the metal screen 34 across the deburring electrode is not substantially affected when this is traversed by a workpiece. Even in the case of very complicated workpiece contours the flowing electrolyte will very uniformly distribute itself over the workpiece edges that are to be deburred.

When the process of deburring one side of the workpieces 39 by the upper deburring electrode 26 has been completed the workpieces are swept by the ejector rail 31, as shown in FIG. 2, notwithstanding the retaining action of the permanent magnets 14, off the surface of the turntable 4 into the turnover chute 32 which turns over the blanks so that their undersides are uppermost before delivering them to the lower turntable 5. Since the deburred sides of the workpieces 39 are deposited on the lower turntable 5, this table top is not subjected to a great deal of wear. As already described with reference to FIG. 3, it is here sufficient to provide contact by a relatively thin graphite plate 15 that covers the turntable 5. The force of attraction of the permanent magnets 14 let into the turntable 5 underneath the graphite plate 15 ensures sufficient adhesion of the workpieces to the graphite plate for the creation of good electrical contact. The rotation of the turntable 5 now carries the other side of the workpieces under the deburring electrode 27 and, in the same way as in the first deburring operation under the upper deburring electrode 26, this other side of the blanks is now also deburred and rounded. When this second deburring process has been completed the workpieces 39, as on the upper table 4, are swept by an ejecting rail (not shown) into an unloading chute which carries the finished workpieces away from the deburring machine. The deburring process is thus completed.

By adjusting the height of the deburring electrodes 26 and 27 by turning the handwheels 28, the machine can be easily adapted to workpieces of varying thicknesses and adjusted to an optimum gap width between electrode and work.

Separate elements for supporting the work on the table top and for making electrical contact with the workpieces, as used on the upper turntable 4 (shown in FIG. 4) are also particularly useful when deburring heavy workpieces that would cause too much wear to graphite plate 5 on account of their weight. On the other hand, in the case of very light flat plate-shaped workpieces, even when their burrs rest on the workpiece supporting surface, the use of a graphite plate 15 which both supports and provides contact may often be best.

In an advantageous modification of the above-described machine, the metal screens 34 in the deburring electrodes may conveniently be replaced by porous sinter metal plates. Many other changes and modifications of the above embodiment of the invention can, of course, be made without departing from the spirit of the invention. Accordingly, the scope of the invention is intended to be limited only by the scope of the appended claims.

What is claimed is:

1. Apparatus for electrochemically deburring the edges of metal workpieces comprising:
   a workpiece carrier for holding a workpiece whose edges are to be deburred, said carrier having a workpiece supporting surface that is approximately parallel to the electrochemically active surface of a deburring electrode and further including elements connected to the positive pole of a source of working voltage for making contact with the workpiece, and
   the deburring electrode adapted for connection to a source of voltage, having an electrochemically active and electrically conductive surface disposed adjacent said carrier for defining a gap through which said electrolyte only flows, said gap being located between said electrochemically active and electrically conductive surface and the workpiece surface, the edges of which are to be deburred, said electrode including an electrolyte chamber and a metal plate having a plurality of distributed openings therethrough whereby electrolyte is delivered to said gap.

2. Apparatus as in claim 1, wherein the dimensions and number of said openings in said metal place are chosen so that the pressure drop of the electrolyte when passing through the opening is much larger than the pressure drop of the electrolyte in the gap between the deburring electode and the workpiece.

3. Apparatus as in claim 1 further including means in the workpiece carrier for locating the workpieces on said workpiece supporting surface.

4. Apparatus as in claim 1 including means for moving the workpiece carrier in directions parallel to said electrochemically active surface of said deburring electrode.

5. Apparatus as in claim 1, wherein said workpiece supporting surface is formed by the surface of a graphite plate which also functions as an element for making electrical contact with the workpieces.

6. Apparatus as in claim 1 wherein the workpiece supporting surface is comprised of a plurality of supporting strips made of ceramic material and provided on said workpiece carrier.

7. Apparatus as in claim 1 wherein said elements for establishing electrical contact with the workpieces include a plurality of graphite plates yieldingly mounted in said workpiece carrier.

8. Apparatus as in claim 3 wherein said elements for locating the workpieces on the workpiece supporting surface of the workpiece carrier are permanent magnets.

9. Apparatus as in claim 5, wherein said permanent magnets are situated underneath said graphite plate.

10. Apparatus as in claim 6, wherein said permanent magnets are situated between the resliently yielding graphite plates.

11. Apparatus as in claim 4, wherein said workpiece carrier is a turntable above which is said deburring electrode is mounted so as to cover a segment of said turntable and in that the part of the turntable surface not covered by the electrode is associated with a workpiece loading station and a workpiece unloading station.

12. Apparatus as in claim 11, wherein said workpiece loading station includes a loading chute terminating on the turntable.

13. Apparatus as in claim 11, wherein said workpiece unloading station comprises an ejecting rail above the turntable which sweeps the workpieces into an unloading chute.

14. Apparatus as in claim 11 including two vertically superimposed coaxial turntables each associated with a deburring electrode and a turnover chute for accepting the workpieces from the unloading station of the upper turntable and delivering the same to the loading station of the lower turntable after turning them upside down.

References Cited

UNITED STATES PATENTS

| | | | |
|---|---|---|---|
| 3,162,588 | 12/1964 | Bell | 204—224 M |
| 3,620,953 | 11/1971 | Inove | 204—201 |
| 3,445,372 | 5/1969 | Fromson | 204—M DIG. |
| 2,803,595 | 8/1957 | Anzaldi | 204—129.1 |
| 3,498,904 | 3/1970 | Williams | 204—M DIG. |

FREDERICK C. EDMUNDSON, Primary Examiner

U.S. Cl. X.R.

204—129.1, 129.5, 224 M, 297 M